(12) United States Patent
Terepka

(10) Patent No.: US 7,245,988 B1
(45) Date of Patent: Jul. 17, 2007

(54) GARMENT INVENTORY MANAGEMENT SYSTEM

(76) Inventor: Stephen Edward Terepka, 692 23rd St. SW., Largo, FL (US) 33770

( * ) Notice: Subject to any disclaimer, the term of this patent is extended or adjusted under 35 U.S.C. 154(b) by 597 days.

(21) Appl. No.: 10/613,910

(22) Filed: Jul. 3, 2003

(51) Int. Cl.
*G06F 7/00* (2006.01)

(52) U.S. Cl. .................. 700/225; 700/213; 700/229; 198/349.6; 198/465.4

(58) Field of Classification Search ............... 700/213, 700/225, 226, 229; 198/349.6, 349.45, 465.4, 198/486
See application file for complete search history.

(56) References Cited

U.S. PATENT DOCUMENTS

| | | | | |
|---|---|---|---|---|
| 4,239,435 A | * | 12/1980 | Weiss et al. ............. | 198/349.8 |
| 4,615,273 A | * | 10/1986 | Osthus et al. ............. | 104/102 |
| 4,991,719 A | * | 2/1991 | Butcher et al. ............. | 209/3.3 |
| 5,125,513 A | * | 6/1992 | Branch ..................... | 209/3.3 |
| 5,377,814 A | * | 1/1995 | Smith et al. ............. | 198/465.4 |
| 5,441,158 A | * | 8/1995 | Skinner ..................... | 209/583 |
| 5,509,572 A | * | 4/1996 | Curtis ..................... | 221/76 |
| 5,573,101 A | * | 11/1996 | Ouwejan ..................... | 198/349 |
| 5,927,472 A | * | 7/1999 | Neef et al. ............. | 198/465.4 |
| 5,927,475 A | * | 7/1999 | Santicchi ..................... | 198/502.3 |
| 6,009,991 A | * | 1/2000 | Anderson ..................... | 198/349 |
| 6,578,671 B2 | * | 6/2003 | Shen ..................... | 186/53 |
| 6,823,236 B2 | * | 11/2004 | Speckhart et al. ............. | 700/215 |
| 2003/0097201 A1 | * | 5/2003 | Min ..................... | 700/229 |

* cited by examiner

Primary Examiner—Khoi H. Tran
(74) Attorney, Agent, or Firm—Edward P. Dutkiewicz

(57) ABSTRACT

A laundry inventory management system comprises several components in combination. A structure has a computer system with a program to store data with the computer being coupled to an electrical source. A pair of trolley rails with each rail having a set of indicia and rail supports. A trolley coupled to the computer has a shuttle track, a plurality of rail wheels, an indicia reading means and a motor. A shuttle with a motor and a pick-up gripper with a motor are coupled to the computer. A power source and a power means drive the trolley motor and the shuttle motor and the pick-up gripper motor. A computer program controls the movement of trolley, shuttle and pick-up gripper.

2 Claims, 5 Drawing Sheets

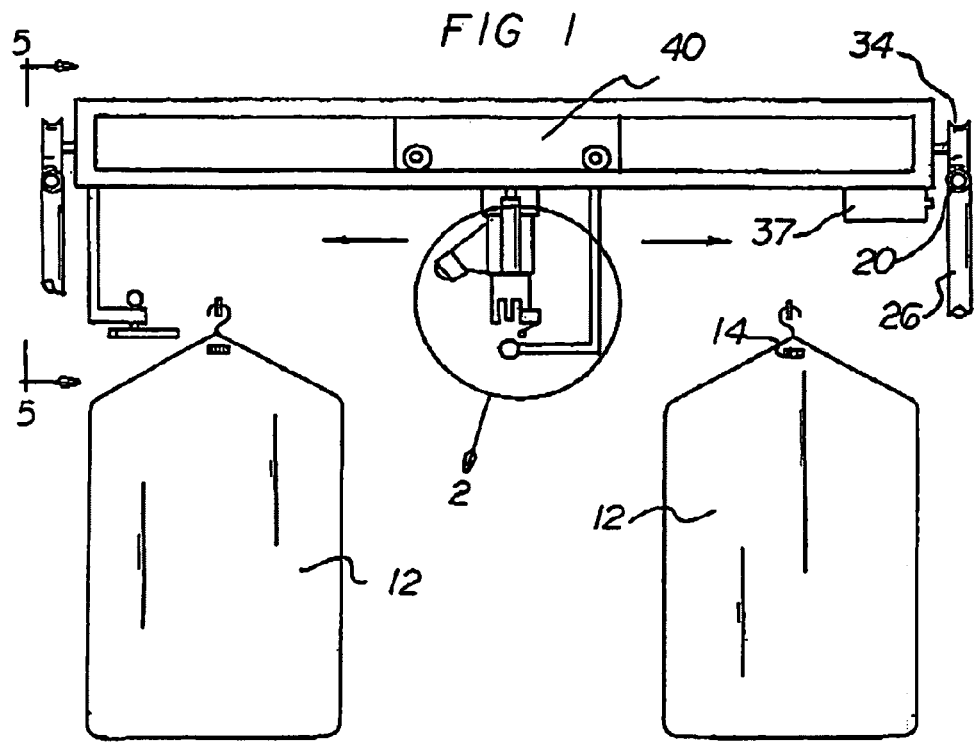
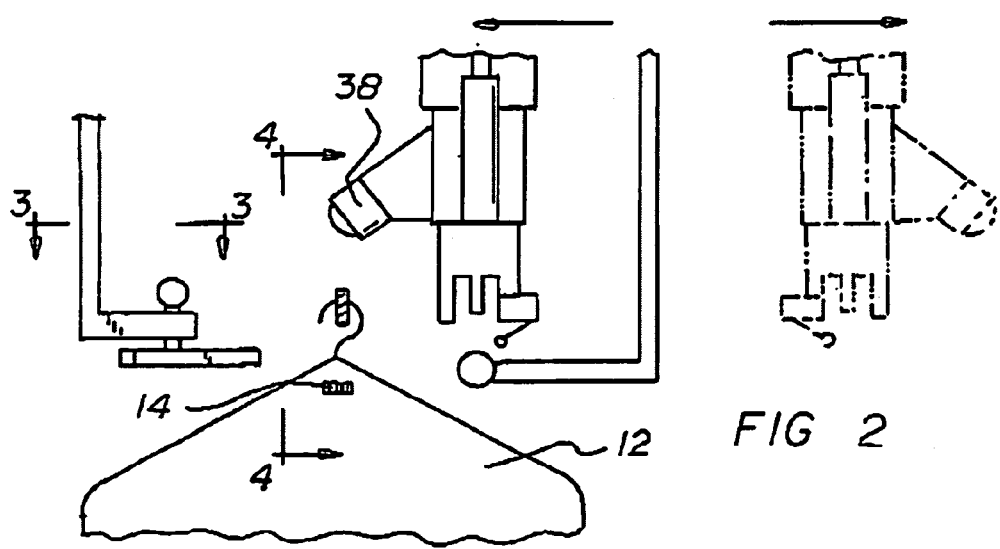

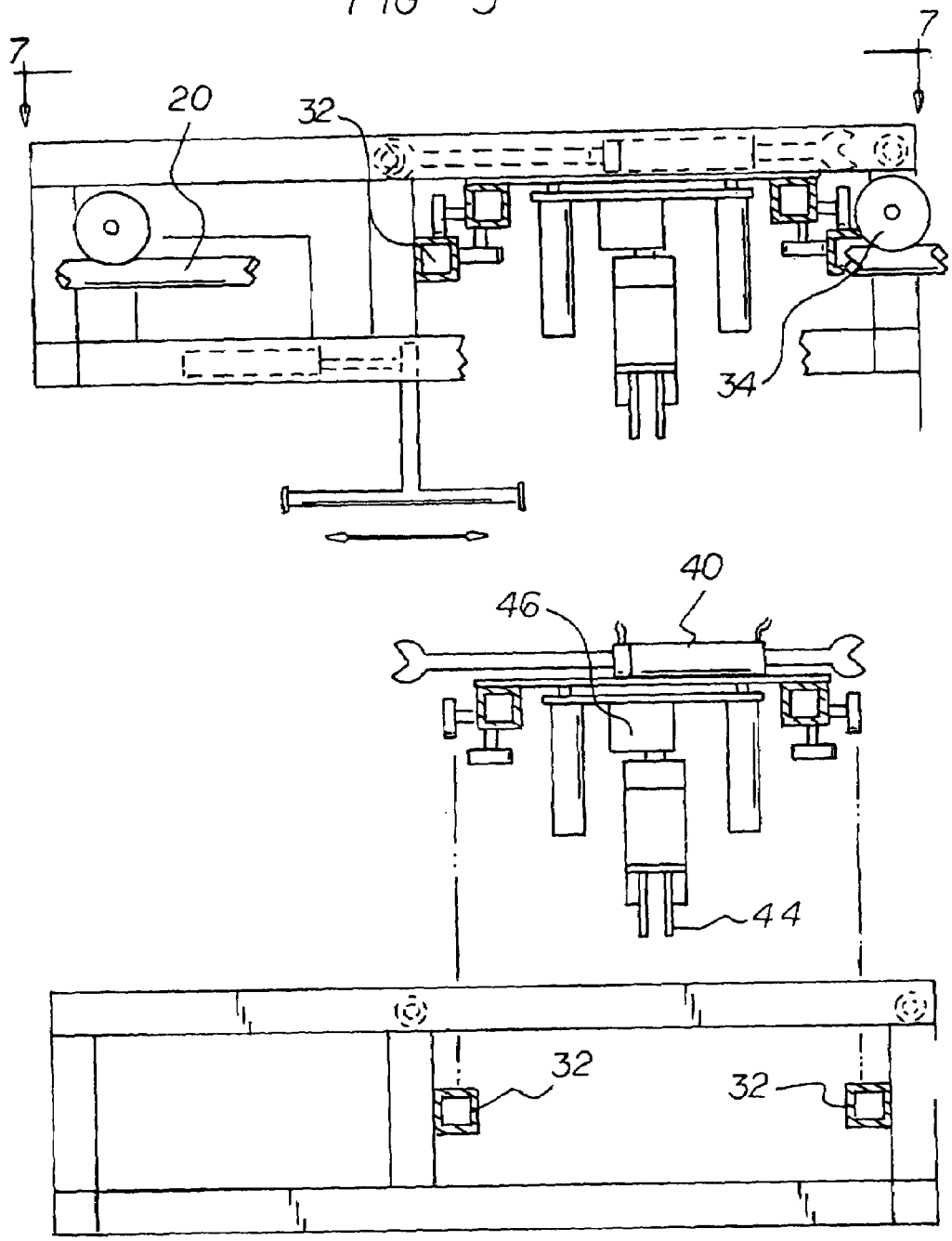

GARMENT INVENTORY MANAGEMENT SYSTEM

The garment inventory management system according to the present invention substantially departs from the conventional concepts and designs of the prior art, and in doing so provides an apparatus primarily developed for the purpose of allowing a user to conveniently and efficiently select garments for transfer.

Therefore, it can be appreciated that there exists a continuing need for a new and improved garment inventory management system which can be used for allowing a user to conveniently and efficiently select garments for transfer. In this regard, the present invention substantially fulfills this need.

SUMMARY OF THE INVENTION

In view of the foregoing disadvantages inherent in the known types of garment management systems now present in the prior art, the present invention provides an improved garment inventory management system. As such, the general purpose of the present invention, which will be described subsequently in greater detail, is to provide a new and improved garment inventory management system and method which has all the advantages of the prior art and none of the disadvantages.

To attain this, the present invention essentially comprises a garment inventory management system for allowing a user to conveniently and efficiently select garments for transfer. The system comprises in combination several components. The components are a pair of rails, a trolley, a shuttle, a pick-up gripper and a computer. First provided is a structure. The structure has an electrical source and a pneumatic source and plurality of surfaces. The surfaces comprise a floor and a ceiling and a plurality of walls. Next provided is a garment on a hanger. Next provided is a computer system having a program. The program stores item identifiers and item locations in memory and retrieves from memory inputted specific locations. Next provided is a pair of trolley rails. The rails are fabricated of a rigid material. The rails have a generally round hollow tubular configuration. Each of the rails has an upper surface and a lower surface and an inner surface and an outer surface. Each of the rails has a set of indicia on the inner surface. Each of the rails has a plurality of rail supports to couple the rails to a surface of the structure. Next provided is a trolley. The trolley is electronically coupled to the computer and electronically coupled to the electrical source. The trolley has a generally rectilinear configuration. The trolley has a right end and a left end an upper surface and a lower surface and four edges there between. The edges comprise two pairs of parallel edges. The lower surface of the trolley has a shuttle track coupled thereto. The right and left ends of the trolley have a plurality of rail wheels to couple the trolley to the rails. The rail wheels are rotated by an electrical motor to move the trolley back and forth along the length of the rails. The trolley has an indicia reading means to allow the trolley to move to an exact location along a rail. The indicia reading means is coupled to the computer. Next provided is a shuttle. The shuttle is electronically coupled to the computer and is electronically coupled to the electrical source. The shuttle has an electrically operated drive motor for moving the shuttle back and forth along the length of the shuttle track. The shuttle has a pick-up gripper coupled there to. The gripper has an electrical motor coupled thereto. The gripper is powered by the electrical source. The gripper is coupled to the computer. Next provided is an electrical conductive means to couple the electrical source and the trolley electrical motor. The conductive means also couples the shuttle and the electrical source. Lastly provided is a computer program which enters a specific location of a garment hanger. The program stores the location of the garment hanger and the program can recall the location of the garment with the program assigning a specific location as defined by a specific indicia to each garment hanger. The program controls the movement of the trolley to the specific indicia. The program then moves the shuttle in a direction to move to the specific location. The gripper engages the garment hanger at the specific location and the trolley then returns the garment hanger to an assigned location.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is importatnt, therefore, that the claims be regarded as including such equivalent constructions insofar as they do not depart from the spirit and scope of the present invention.

It is therefore an object of the present invention to provide a new and improved garment inventory management system which has all of the advantages of the prior art laundry management systems and none of the disadvantages.

It is another object of the present invention to provide a new and improved garment inventory management system which may be easily and efficiently manufactured and marketed.

It is further object of the present invention to provide a new and improved garment inventory management system which is of durable and reliable constructions.

An even further object of the present invention is to provide a new and improved garment inventory management system which is susceptible of a low cost of manufacture with regard to both materials and labor, and which accordingly is then susceptible of low prices of sale to the consuming public, thereby making such garment inventory management system economically available to the buying public.

Even still another object of the present invention is to provide a garment inventory management system for allowing a user to conveniently and efficiently select garments for transfer.

Lastly, it is an object of the present invention to provide a new and improved garment inventory management system having several components in combination. A structure has a computer system with a program to store data with the computer being coupled to an electrical source. A pair of trolley rails with each rail having a set of indicia and rail supports. A trolley coupled to the computer has a shuttle track, a plurality of rail wheels, an indicia reading means and a motor. A shuttle with a motor and a pick-up gripper with a motor are coupled to the computer. A power source and a power means drive the trolley motor and the shuttle motor and the pick-up gripper motor. A computer program controls the movement of trolley, shuttle and pick-up gripper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation of the laundry inventory management system.

FIG. 2 is a close up view of circle 2 of FIG. 1 showing the shuttle of the system.

FIG. 5 is a side elevation of the system.

FIG. 6 is a side elevation showing the shuttle removed from the trolley.

The same reference numerals refer to the same parts throughout the various Figures.

DESCRIPTION OF THE PREFERRED EMBODIMENT

Figure 3:
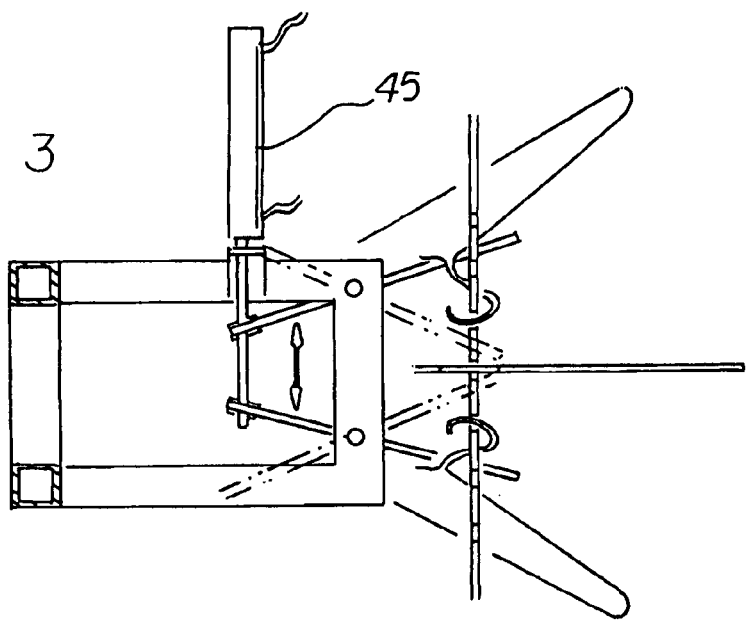
FIG. 3 is a planar view of the close up of the shuttle taken along line 3-3 of FIG. 2.
Figure 4:
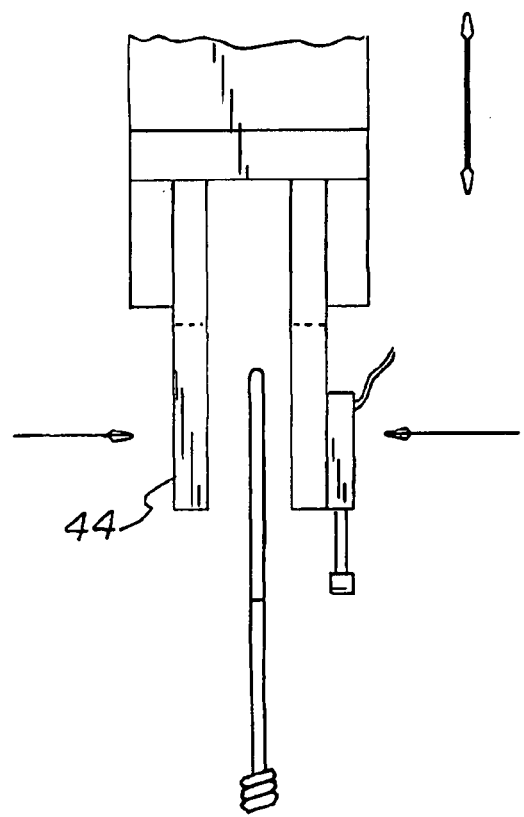
FIG. 4 is a side elevation close up of the shuttle taken along line 4-4 of FIG. 2.
Figure 7:
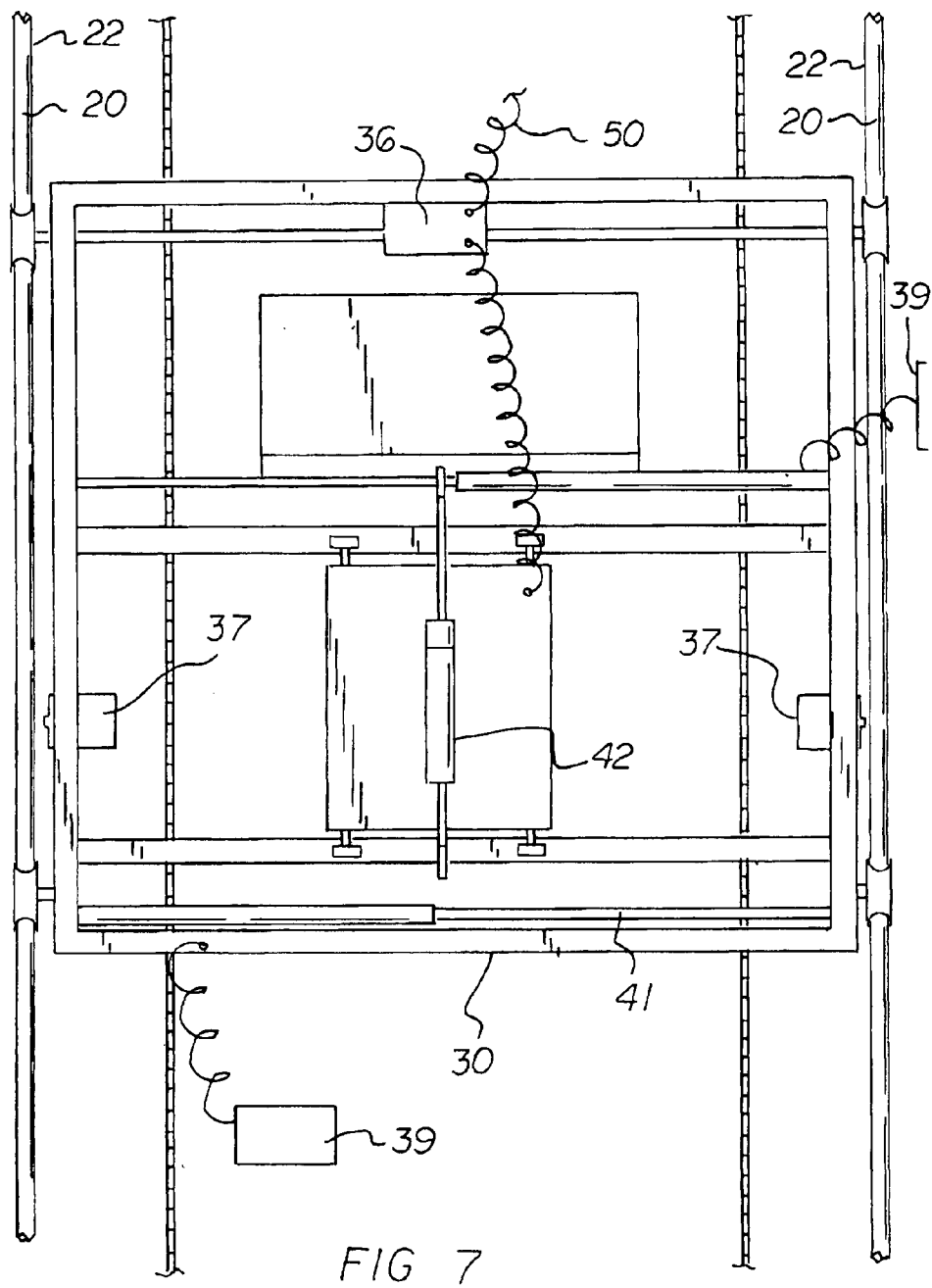
FIG. 7 is a top planar overview of the system taken along line 7-7 of FIG. 5.
Figure 8:
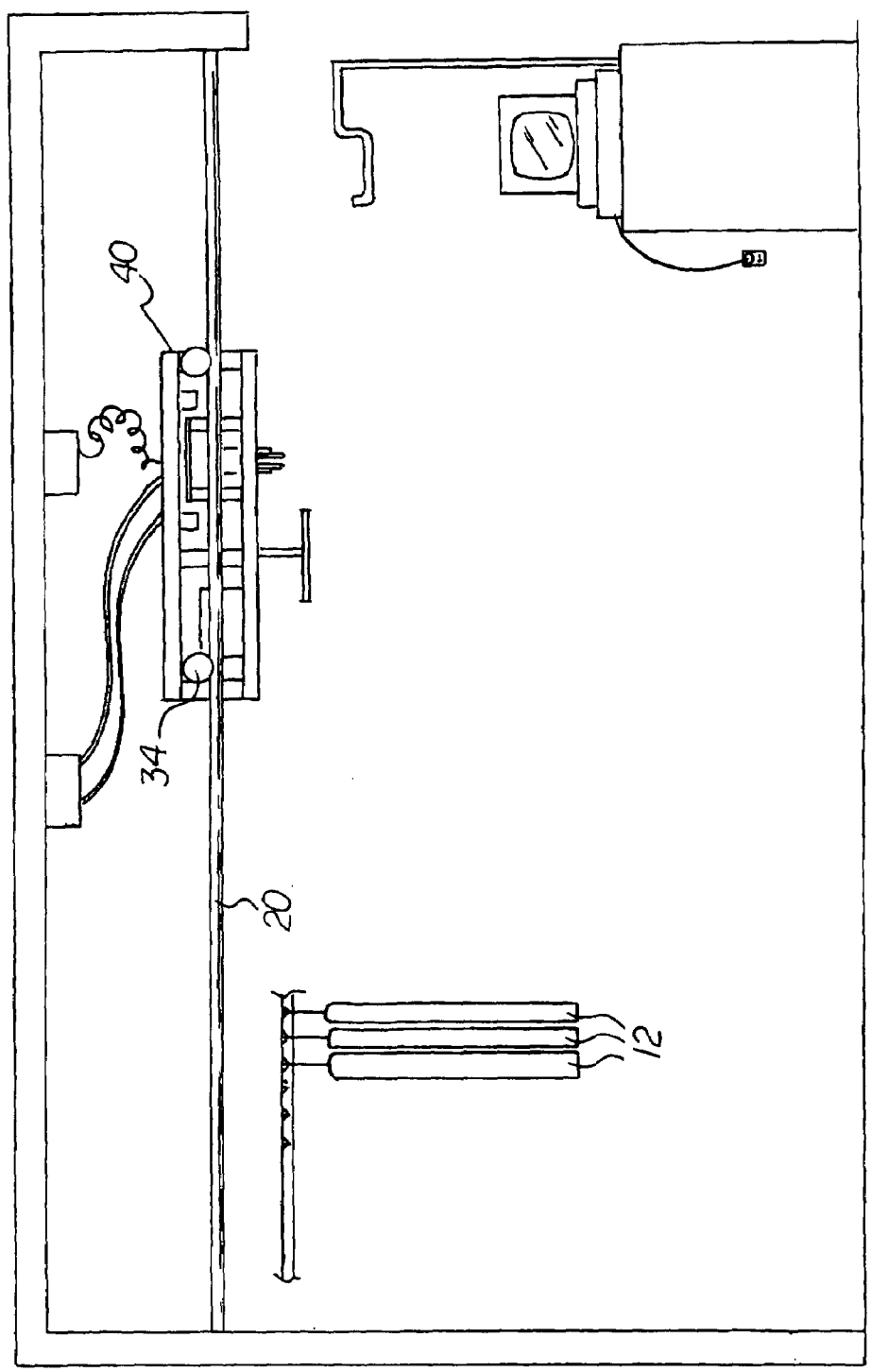
FIG. 8 is a side view of the invention demonstrating the relationship of the components to the structure.

With reference now to the drawings, and in particular to FIG. 1 thereof, the preferred embodiment of the new and improved garment inventory management system embodying the principles and concepts of the present invention and generally designated by the reference numeral 10 will be described.

The present invention, the garment inventory management system 10 is comprised of a plurality of components. Such components in their broadest context include a structure, a computer system, a pair of trolley rails, a shuttle, a power source and power means, and a computer program. Such components are individually configured and correlated with respect to each other so as to attain the desired objective.

A garment inventory management system 10 for allowing a user to conveniently and efficiently select garments for transfer comprises in combination several components. The components are a pair of rails, a trolley, a shuttle, a pick-up gripper and a computer.

First provided is a structure. The structure has an electrical source and plurality of surfaces. The surfaces comprise a floor and a ceiling and a plurality of walls.

Next provided is a garment on a hanger 12. Each garment has a set of indicia 14 on the outer surface.

Next provided is a computer system 16 having a program. The program stores locations in memory and retrieve from memory inputted specific locations.

Next provided is a pair of trolley rails 20. The rails are fabricated of a rigid material. The rails have a generally round hollow tubular configuration. Each of the rails has an upper surface and a lower surface and an inner surface 22 and an outer surface. Each of the rails has a plurality of rail supports 26 to couple the rails to a surface of the structure.

In an alternate embodiment, the indicia may be coupled to the trolley rails so that each location for a garment hanger may be associated with a specific indicia. The indicia on a garment and an indicia on the rail are not mutually exclusive and an alternate embodiment may utilize both types of indicia at the same time. The rails may be configured in any one of a plurality of geometric configurations, such as rectangular, round, oval or square. The rails may also comprise slides for the trolley. The rails may also have an electrical means coupled there to, therefore comprising part of the electrical conduction system.

Next provided is a trolley 30. The trolley is electronically coupled to the computer and electronically coupled to the electrical source. The trolley has a generally rectilinear configuration. The trolley has a right end and a left end an upper surface and a lower surface and four edges there between. The edges comprise two pairs of parallel edges. The lower surface of the trolley has a shuttle track 32 coupled thereto. The right and left ends of the trolley have a plurality of rail wheels 34 to couple the trolley to the rails. The rail wheels are rotated by an electrical motor 36 to move the trolley back and forth along the length of the rails.

In an alternate embodiment the trolley may have an indicia reader 37 to read indicia on either one of the rails. The reader allows the trolley to proceed to any one exact location along the rail for garment insertion or retrieval.

In an alternate embodiment the trolley may be coupled to a chain which controls the movement to a precise location. The trolley may have a stepped motor or a servo-controlled motor.

Next provided is a pneumatic power source 39. The pneumatic source is utilized to supply a means for powering air or gas driven components of the invention.

Next provided is a shuttle 40. The shuttle is electronically coupled to the computer and is electronically coupled to the electrical source. The shuttle is coupled to the pneumatic power source and has a pneumatically operated dual-cylinder 41 switch-back drive 42 for moving the shuttle back and forth along the length of the shuttle track. The shuttle has an indicia reading means 38 to allow the trolley to move to an exact location. The indicia reading means is coupled to the computer. The shuttle has a pick-up gripper 44 coupled there to. The gripper has a pneumatic motor 46 coupled thereto. The gripper is powered by the pneumatic source. The gripper is coupled to the computer. The shuttle has a hanger spreader 45 to allow the discrete selection and picking up of a specific hanger as identified by the indicia and computer program.

Next provided is an electrical conductive means 50 to couple the electrical source and the trolley electrical motor. The conductive means also couples the shuttle and the electrical source.

In an alternate embodiment the entire system may be powered pneumatically or electrically, or any other combination of power sources.

Lastly provided is a computer program which enters a specific location of a garment hanger. The program stores the location of the garment hanger and the program can recall the location of the garment with the program assigning a specific location as defined by a specific indicia to each garment hanger. The program controls the movement of the trolley to the specific indicia of the garment. The program then moves the shuttle in a direction to move to the specific location. The gripper engages the garment hanger at the specific location and the trolley then returns the garment hanger to an assigned location.

In an alternate embodiment the computer program identifies a garment with a specific location and a specific indicia which is coupled to a rail. The compute program can direct and control the trolley, and the shuttle, to the exact location to retrieve the garment in that location. The use of one type of indicia is not mutually exclusive in that both of the types of indicia, garment coupled or rail coupled indicia, may be used in conjunction with each other.

Also provided is a method by which garments may be placed or retrieved. The method uses a structure having an electrical source and plurality of surfaces. The surfaces comprise a floor and a ceiling and a plurality of walls to house the management system.

Next, the system provides a garment on a hanger to be moved into or from the rails which constitute a storage for garments.

Next provided is a computer system having a program to store in memory and retrieve from memory inputted specific locations. The computer controls the movement of the components of the management system.

Next provided is a pair of trolley rails fabricated of a rigid material and having a plurality of rail supports to couple the rails to a surface of the structure. The rails aligned in a parallel manner.

Next provided is a trolley being electronically coupled to the computer and electronically coupled to the electrical source. The trolley has a shuttle track coupled thereto. The trolley has a plurality of motor driven rail wheels to couple the trolley to the rails.

Next provided is a shuttle being electronically coupled to the computer and electronically coupled to the electrical source. The shuttle is coupled to the pneumatic power source. The shuttle has a pneumatically operated dual-cylinder switch-back drive. The shuttle has an indicia reading means. The shuttle has a pick-up gripper coupled there to. The gripper has an electrical motor being couple thereto and is powered by the electrical source. The gripper is coupled to the computer. The shuttle has a hanger spreader. The shuttle movement is controlled by the computer.

Next provided is an electrical conductive means to couple the electrical source and the trolley electrical motor. The conductive means also couples the shuttle and the electrical source to provide power to the components of the management system. The components of the system are actuated under the control of a computer program. The program enters a specific indicia of a garment hanger. The program stores the location of the garment hanger. The program can recall the location of the garment with the program assigning a specific location as defined by a specific indicia to each garment hanger location. The program controls the movement of the trolley to the specific indicia. The program controls the movement of the shuttle to the specific location. The gripper engages the garment hanger at the specific location and the trolley then returns the garment hanger to an assigned location. This system allows a user to direct the computer to find and retrieve a garment. The trolley will move to the appropriate location and the shuttle will move to pick up the desired garment. The pick-up gripper and the trolley convey the garment to a desired location.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A laundry inventory management system for allowing a user to conveniently and efficiently select garments for transfer, comprising, in combination:

a structure having an electrical source and plurality of surfaces, the surfaces comprising a floor and a ceiling and a plurality of walls;

a garment on a hanger, the garment having an indicia coupled thereto;

a computer system having a program to store in memory and retrieve from memory inputted specific locations;

a pair of trolley rails fabricated of a rigid material and having a generally round hollow tubular configuration, each of the rails having an upper surface and a lower surface and an inner surface and an outer surface, with each of the rails having a plurality of rail supports to couple the rails to a surface of the structure;

a trolley being electronically coupled to the computer and electronically coupled to the electrical source, the trolley having a generally rectilinear configuration with a right end and a left end an upper surface and a lower surface and four edges there between, the edges comprising two pairs of parallel edges, the lower surface of the trolley having a shuttle track coupled thereto, with the right and left end of the trolley having a plurality of rail wheels to couple the trolley to the rails with the rail wheels being rotated by an electrical motor to move the trolley back and forth along the length of the rails;

a pneumatic power source;

a shuttle being electronically coupled to the computer and electronically coupled to the electrical source, the shuttle being coupled to the pneumatic power source with the shuttle having a pneumatically operated dual-cylinder switch-back drive for moving the shuttle back and forth along the length of the shuttle track, the shuttle having an indicia reading means to allow the trolley to move to an exact location along a rail with the indicia reading means being coupled to the computer, the shuttle having a pick-up gripper coupled there to, the gripper having a pneumatically driven motor being coupled thereto and powered by the pneumatic source, with the gripper being coupled to the computer, the shuttle having a hanger spreader;

a electrical conductive means to couple the electrical source and the trolley electrical motor, the conductive means also coupling the shuttle and the electrical source; and a computer program which enters a specific location of a garment hanger and the program stores the location of the garment hanger and the program can recall the location of the garment with the program assigning a specific location as defined by a specific indicia to each garment hanger location, the program controlling the movement of the trolley to the specific indicia and then moving the shuttle in a direction to move to the specific location, with the gripper engaging the garment hanger at the specific location and the trolley then returning the garment hanger to an assigned location.

2. A method of laundry inventory management for allowing a user to conveniently and efficiently select garments for transfer, comprising, in combination:

providing a structure having an electrical source and plurality of surfaces, the surfaces comprising a floor and a ceiling and a plurality of walls to house the management system;

providing a garment on a hanger to be moved;

providing a computer system having a program to store in memory and retrieve from memory inputted specific locations to control the movement of the components of the management system;

providing a pair of trolley rails fabricated of a rigid material and having a plurality of rail supports to couple the rails to a surface of the structure, the rails aligned in a parallel manner;

providing a trolley being electronically coupled to the computer and electronically coupled to the electrical source, the trolley having a shuttle track coupled thereto, with the trolley having a plurality of motor driven rail wheels to couple the trolley to the rails;

providing a shuttle being electronically coupled to the computer and electronically coupled to the electrical source, the shuttle being coupled to the pneumatic power source with the shuttle having a pneumatically operated dual-cylinder switch-back drive, the shuttle having an indicia reading means, the shuttle having a pick-up gripper coupled there to, the gripper having an electrical motor being couple thereto and powered by the electrical source, with the gripper being coupled to the computer, the shuttle having a hanger spreader, the shuttle movement being controlled by the computer;

providing an electrical conductive means to couple the electrical source and the trolley electrical motor, the conductive means also coupling the shuttle and the electrical source to provide power to the components of the management system; and actuating the system under the control of a computer program which enters a specific indicia of a garment hanger and the program stores the location of the garment hanger and the program can recall the location of the garment with the program assigning a specific location as defined by a specific indicia to each garment hanger location, the program controlling the movement of the trolley to the specific indicia and then moving the shuttle in a direction to move to the specific location, with the gripper engaging the garment hanger at the specific location and the trolley then returning the garment hanger to an assigned location, whereby a user can direct the computer to find and retrieve a garment, and the trolley will move to the appropriate location, with the shuttle moving to pick up the garment with the pick-up gripper, and the trolley conveying the garment to a desired location.

* * * * *